US012716653B2

(12) United States Patent
Debo et al.

(10) Patent No.: US 12,716,653 B2
(45) Date of Patent: Aug. 25, 2026

(54) FREEZE DRYING WITH COMBINED FREEZING CHAMBER AND CONDENSER

(71) Applicant: IMA Life North America Inc., Tonawanda, NY (US)

(72) Inventors: David Debo, Batavia, NY (US); Arnab Ganguly, Thousand Oaks, CA (US); Dennis Posheluk, Tonawanda, NY (US); Ernesto Renzi, Youngstown, NY (US)

(73) Assignee: IMA Life North America Inc., Tonawanda, NY (US)

( * ) Notice: Subject to any disclaimer, the term of this patent is extended or adjusted under 35 U.S.C. 154(b) by 890 days.

(21) Appl. No.: 17/927,546

(22) PCT Filed: May 24, 2021

(86) PCT No.: PCT/US2021/033854
§ 371 (c)(1),
(2) Date: Nov. 23, 2022

(87) PCT Pub. No.: WO2021/247265
PCT Pub. Date: Dec. 9, 2021

(65) Prior Publication Data

US 2023/0235956 A1 Jul. 27, 2023

Related U.S. Application Data

(60) Provisional application No. 63/033,049, filed on Jun. 1, 2020.

(51) Int. Cl.

| | |
|---|---|
| ***F26B 5/06*** | (2006.01) |
| ***F26B 5/04*** | (2006.01) |
| ***F26B 25/00*** | (2006.01) |

(52) U.S. Cl.
CPC .............. *F26B 5/065* (2013.01); *F26B 5/041* (2013.01); *F26B 25/002* (2013.01)

(58) Field of Classification Search
CPC ......... F26B 5/065; F26B 5/041; F26B 25/002
See application file for complete search history.

(56) References Cited

U.S. PATENT DOCUMENTS 3,621,587 A 11/1971 Smith, Jr.
3,633,283 A 1/1972 Mishkin et al.
(Continued)

FOREIGN PATENT DOCUMENTS

BE 658261 A 4/1965
CN 105318665 A 2/2016
(Continued)

OTHER PUBLICATIONS

Translation WO-2017084162-A1 (Year: 2017).*
(Continued)

*Primary Examiner* — Jessica Yuen
(74) *Attorney, Agent, or Firm* — Barclay Damon LLP

(57) ABSTRACT

A compact freeze dryer removes a liquid from a bulk powder product. The freeze dryer utilizes a single cryogenic vessel for both (1) freezing the liquid contained in the bulk product, and (2) condensing vapor resulting from sublimating the frozen liquid. A vacuum pump is connected to the cryogenic vessel for drawing a vacuum in the cryogenic vessel and in a drying vessel. Vapor resulting from subliming the frozen liquid in the drying vessel is drawn into the cryogenic vessel and condensed.

14 Claims, 4 Drawing Sheets

(56) References Cited

U.S. PATENT DOCUMENTS

| | | | |
|---|---|---|---|
| 8,978,268 | B2 | 3/2015 | Itou et al. |
| 10,465,985 | B2 | 11/2019 | Ganguly et al. |
| 2010/0107437 | A1 | 5/2010 | Ogata et al. |

FOREIGN PATENT DOCUMENTS

| | | | | | |
|---|---|---|---|---|---|
| DE | 102004005660 | A1 | | 8/2005 | |
| WO | WO-2016196110 | A1 | * | 12/2016 | ................ F26B 3/28 |
| WO | WO-2017084162 | A1 | * | 5/2017 | ................ F26B 5/06 |

OTHER PUBLICATIONS

Translation WO-2016196110-A1 (Year: 2016).*

International Search Report, International Application No. PCT/US2021/033854, mailed Aug. 24, 2021, pp. 1-6, European Patent Office.

Written Opinion of the International Search Authority, International Application No. PCT/US2021/033854, mailed Aug. 24, 2021, pp. 1-10, European Patent Office.

* cited by examiner

FREEZE DRYING WITH COMBINED FREEZING CHAMBER AND CONDENSER

CROSS REFERENCE TO RELATED APPLICATIONS

This application is a U.S. national stage application and claims the benefit of priority under 35 U.S.C. § 371 of International Patent Application No. PCT/US2021/033854 filed on May 24, 2021 entitled FREEZE DRYING WITH COMBINED FREEZING CHAMBER AND CONDENSER which claims the benefit of priority under 35 U.S.C. § 119 (e) of U.S. Provisional Application No. 63/033,049 filed on Jun. 1, 2020 and entitled FREEZE DRYING WITH COMBINED FREEZING CHAMBER AND CONDENSER, both which are incorporated herein by reference in their entirety.

FIELD OF THE INVENTION

The present invention relates generally to freeze drying processes and equipment for removing moisture from a product using sublimation under vacuum and low temperature.

BACKGROUND

Freeze drying is a process that removes a solvent or suspension medium from a product. While the present disclosure uses water as the exemplary solvent, other media, such as alcohol, may also be removed in freeze drying processes and may be removed with the presently disclosed methods and apparatus.

In a freeze drying process for removing water, the water in the product is frozen to form ice. Under vacuum, the ice is sublimed and the resulting water vapor flows to a condenser. The water vapor is condensed on the condenser as ice and is later removed. Freeze drying is particularly useful in the pharmaceutical industry, as the integrity of the product is preserved during the freeze drying process and product stability can be guaranteed over relatively long periods of time. The freeze dried product is ordinarily, but not necessarily, a biological substance.

Pharmaceutical freeze drying is often an aseptic process that requires sterile conditions within the freeze drying system. It is critical to assure that all components of the freeze drying system coming into contact with the product are sterile.

Bulk freeze drying under aseptic conditions may be performed in a freeze dryer having shelves for supporting trays of product. In one example of a prior art freeze drying system 100 shown in FIG. 1, a batch of product 112 is placed in freeze dryer trays 121 within a freeze drying chamber 110. Freeze dryer shelves 123 are used to support the trays 121 and to transfer heat to and from the trays and the product as required by the process. A heat transfer fluid flowing through conduits within the shelves 123 is used to remove or add heat.

Under vacuum, the frozen product 112 is heated slightly to cause sublimation of the ice within the product. Water vapor resulting from the sublimation of the ice flows through a passageway 115 into a condensing chamber 120 containing condensing coils or other surfaces 122 maintained below the condensation temperature of the water vapor. A coolant is passed through the coils 122 to remove heat, causing the water vapor to condense as ice on the coils.

Both the freeze drying chamber 110 and the condensing chamber 120 are maintained under vacuum during the drying process by a vacuum pump 150 connected to the exhaust of the condensing chamber 120. Non-condensable gases contained in the chambers 110, 120 are removed by the vacuum pump 150 and exhausted through a higher pressure outlet 152.

One technique for preparing a product suspension or solution for a freeze drying process is spray freezing, in which a product is atomized in a spray freezing vessel and exposed to a freezing medium such as cold nitrogen gas. Particle size of the atomized product may be controlled to form a frozen powder having a large surface-area-to-mass ratio, increasing the efficiency of the subsequent drying process.

In certain applications, a batch process such as that described above may be used, in which the freezing step is completed on a batch of product before the frozen product is dried in a drying chamber. Such an arrangement in pilot processes and product development equipment allows for experimental flexibility and allows the use of simpler and lower-cost equipment.

There is a need for improved equipment and technique for use in low-volume applications such as pilot processes and product development. The equipment should have a minimum footprint for use in a laboratory environment. The equipment should be capable of producing sterile product for use in product trials. The equipment should be simple, low-cost and energy efficient.

SUMMARY

The present disclosure addresses the needs described above by providing a freeze drying system for freeze drying a bulk product by removing a liquid. The system comprises a cryogenic vessel having a cooling element, a product introduction inlet in communication with an interior of the cryogenic vessel and connected to a source of the bulk product, and a drying chamber having a warming element. A selectively openable and closeable product transfer conduit connects the cryogenic vessel with the drying chamber, and at least one selectively openable and closeable bypass conduit connects the cryogenic vessel with the drying chamber via at least one vapor inlet of the cryogenic vessel. A selectively operable vacuum pump is in communication with the interior of the cryogenic vessel via a vacuum outlet of the cryogenic vessel, the vacuum outlet of the cryogenic vessel being separate from the at least one vapor inlet of the cryogenic vessel.

Another embodiment comprises a freeze drying system for freeze drying a bulk product by removing a liquid, comprising a cryogenic vessel having a cooling element, a product introduction inlet in communication with an interior of the cryogenic vessel and connected to a source of the bulk product, and a drying chamber having a warming element. A selectively openable and closeable product transfer conduit connects the cryogenic vessel with the drying chamber via at least one vapor inlet of the cryogenic vessel. A selectively operable vacuum pump is in communication with the interior of the cryogenic vessel via a vacuum outlet of the cryogenic vessel, the vacuum outlet of the cryogenic vessel being separate from the at least one vapor inlet of the cryogenic vessel.

Another embodiment of the invention is a method for freeze drying a bulk product containing a liquid. The method comprises providing a cryogenic vessel having a cooling element; providing a drying chamber having a warming element, the cryogenic vessel and the drying chamber fluidly communicating via a transfer conduit intercepted by a transfer valve; isolating the cryogenic vessel from the drying chamber by closing the transfer valve; introducing the bulk product containing the liquid into the cryogenic vessel containing a gas having a first pressure and a temperature below a freezing point of the liquid, whereby the liquid is frozen to form a bulk product containing a frozen liquid in the cryogenic vessel; removing the isolation of the cryogenic vessel from the drying chamber by opening the transfer valve; transferring the bulk product containing frozen liquid from the cryogenic vessel to the drying chamber via the transfer conduit; subjecting the cryogenic vessel and the drying chamber, while the cryogenic vessel and the drying chamber are in fluid communication, to a vacuum pressure lower than the first pressure, whereby the frozen liquid in the drying chamber sublimates to form a vapor; drawing the vapor from the drying chamber to the cryogenic vessel; and condensing the vapor in the cryogenic vessel.

DESCRIPTION

The present disclosure describes systems and methods for freeze drying bulk materials in an efficient manner using a compact, low cost system. The systems and methods of the present disclosure are directed to a bulk powder freeze dryer which is optimized to freeze and dry product to produce a powder form.

The processes and apparatus may be used in drying pharmaceutical products that require aseptic or sterile processing, such as injectables. The methods and apparatus may also be used, however, in processing materials that do not require aseptic processing, but require moisture removal while preserving structure. For example, ceramic/metallic products used as superconductors or for forming nanoparticles or microcircuit heat sinks may be produced using the disclosed techniques.

The presently described system advantageously utilizes a single cryogenic vessel as both (1) a freezing chamber for freezing the medium containing the bulk product during a freezing stage of the process, and (2) a condenser for condensing the sublimated medium during a drying stage. In embodiments, the cryogenic vessel is a spray freezing tower having cooled walls. During the freezing stage of certain embodiments, the solution or slurry containing the bulk product and medium is sprayed from one of more nozzles at the top of the cryogenic vessel, and the medium freezes as it falls through the tower, creating a powdered frozen product. A product transfer conduit between the spray freezing tower and a drying chamber may be opened at intervals to allow the powdered frozen product to fall from the cryogenic vessel to the drying chamber.

During a drying stage of certain embodiments, a vacuum pump in communication with the cryogenic vessel is activated, evacuating the cryogenic vessel. One or more bypass conduits between the cryogenic vessel and the drying chamber may bypass the product transfer conduit, and provide fluid communication between the cryogenic vessel and the drying chamber during the drying stage.

The drying chamber is therefore also evacuated by the vacuum pump via the cryogenic vessel and the bypass conduits, and the medium containing the bulk product sublimates in the drying chamber. The sublimated medium passes as a vapor through the bypass conduits into the cryogenic vessel, which is maintained under cold conditions by continuing to cool the walls after the freezing stage during the drying stage. The vapor condenses in the cryogenic vessel. The resulting condensate is periodically removed.

By using the same vessel for freezing the medium during the freezing stage and for condensing vaporized medium during the drying stage, the presently disclosed system eliminates the need for a separate condensing chamber, reducing the size and bulk of the system. Further, the system is more energy efficient because only a single chamber is cooled instead of cooling both a freezing chamber and a condenser. Initial cost of the system is lower because there are fewer components.

Figure 1:
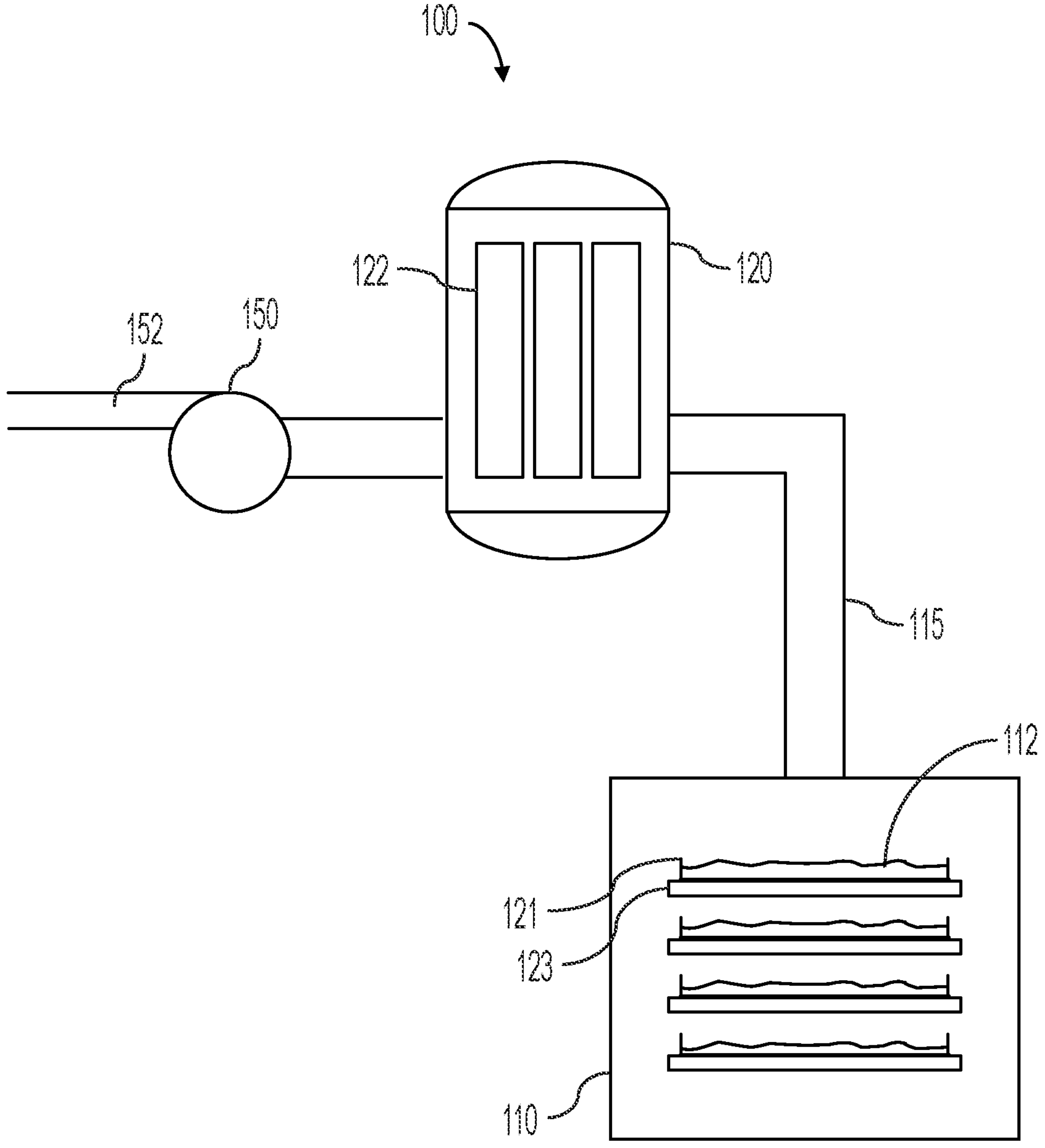
Fig. 1 PRIOR ART
FIG. 1 is a schematic drawing of a prior art freeze drying system.
Figure 2A:
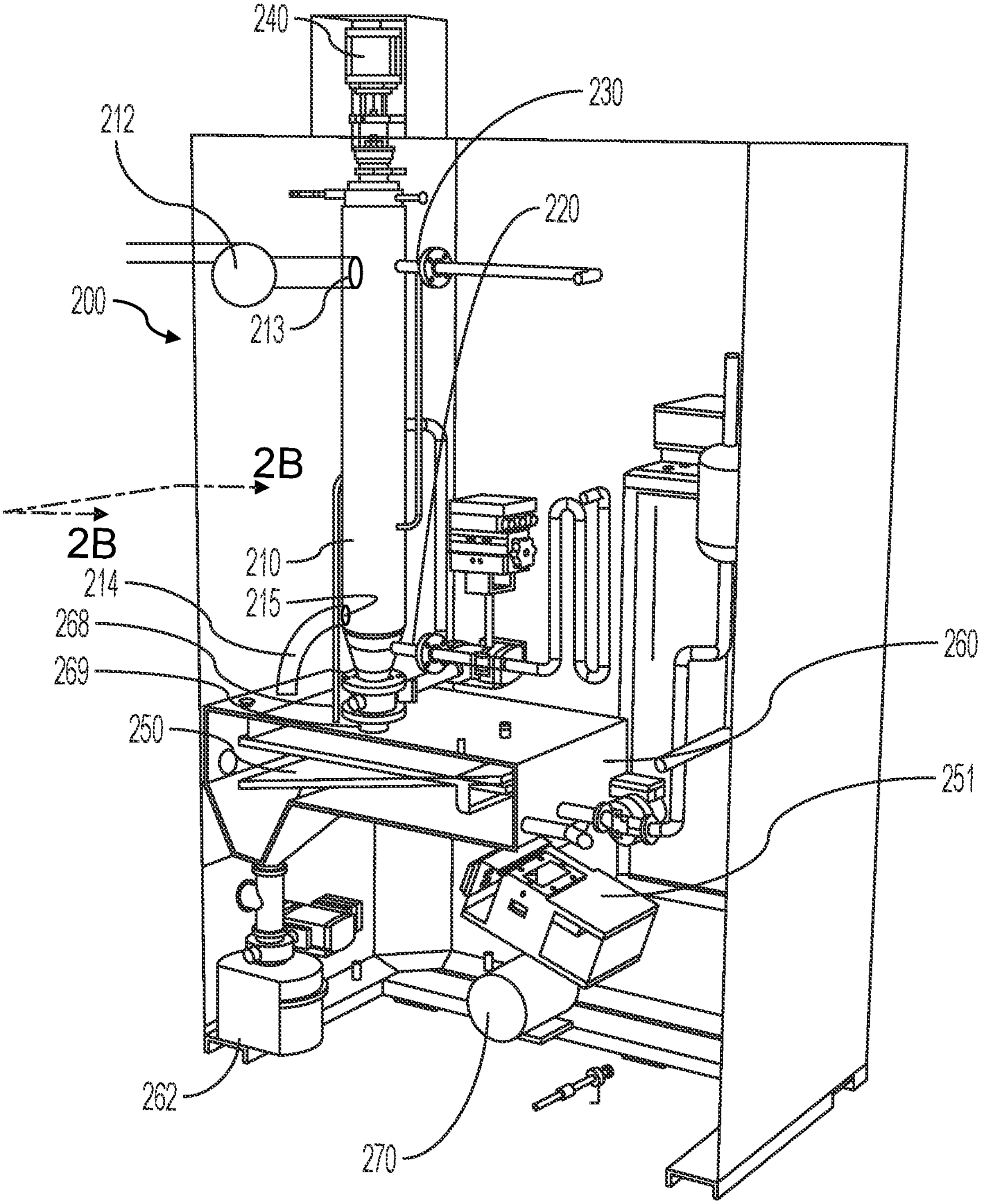
FIG. 2A is a partial cutaway schematic perspective view of a freeze drying system according to one embodiment of the disclosure.
Figure 2B:
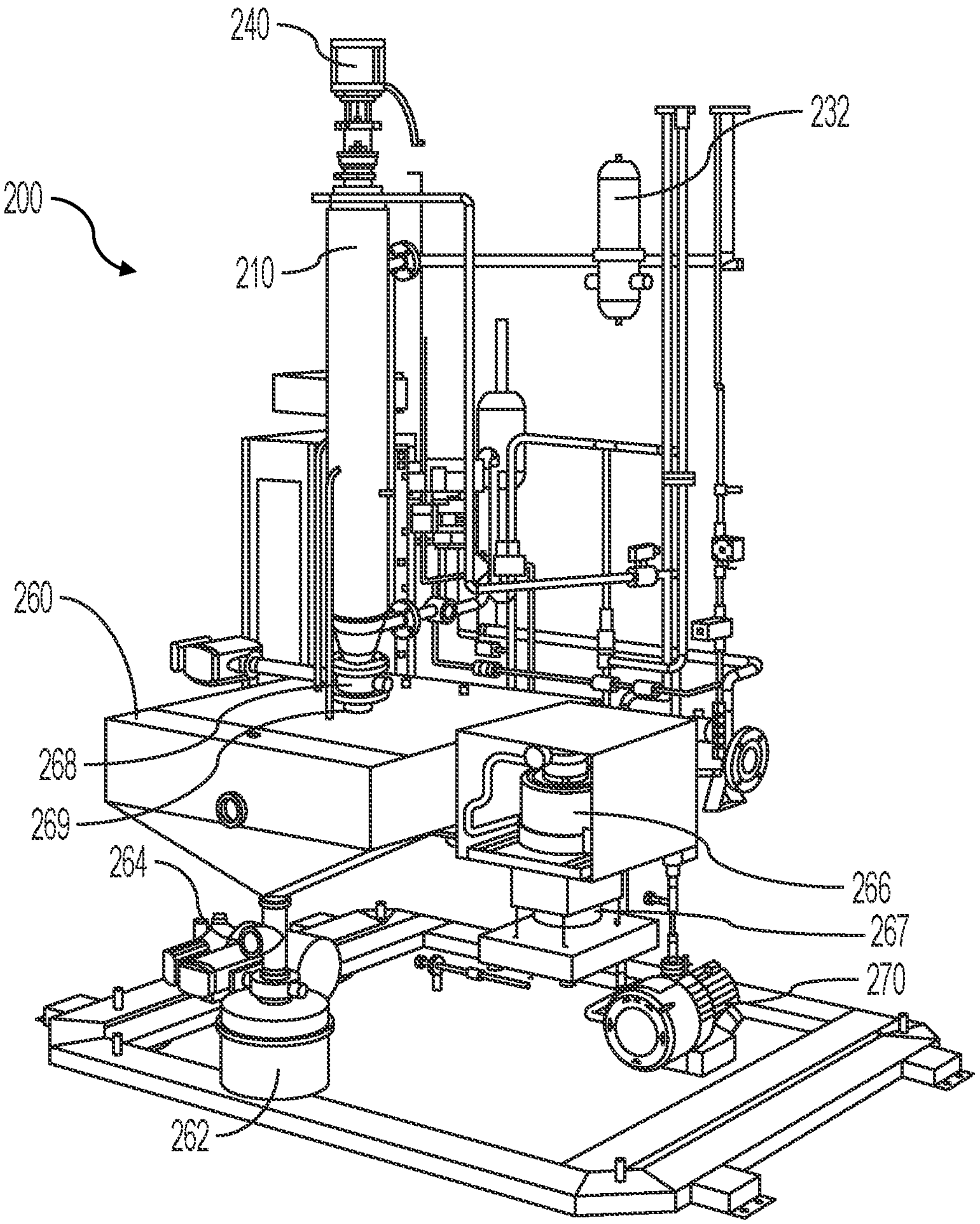
FIG. 2B is schematic perspective view 2B-2B of the freeze drying system of FIG. 2A.

An exemplary system 200 in accordance with one disclosed embodiment is shown in FIGS. 2A and 2B. A cryogenic vessel 210 serves as both a freezing chamber for freezing the product and as a condenser for removing condensable gases from effluent produced while drying the product. The system 200 may be used to perform a batch freeze drying process that includes a freezing stage and a drying stage. In one example, a maximum batch size may be about 5 liters of a product/medium suspension or solution.

In the embodiment shown, an interior of the vessel 210 is cooled by circulating a cryogenic fluid such as liquid nitrogen through an inlet 220, through a double wall of the vessel 210, and through an outlet 230. In other embodiments, cooling elements other than the walls may be used to chill the contents of the vessel 210. The vessel may be cylindrical, having vertical curved side walls. The vessel may include a conical bottom for directing frozen product to an isolation valve 268. During the freezing stage, the interior of the vessel 210 may be filled with sterile gaseous nitrogen, which may be filtered using a sterile filter 232. Sterile nitrogen gas may additionally be used to regulate other pressures in the system.

Spray nozzles 240 are connected to a liquid product reservoir 266 containing bulk product suspended or dissolved in a liquid medium, such as a suspension or solution of a biological solid in water or another liquid. The liquid product reservoir includes a cooling system such as a peltier plate to maintain the product in a refrigerated state if necessary for product preservation. The amount of suspension or solution in the liquid product reservoir 266 may be monitored by a weighing scale 267 that measures a weight of the reservoir system including the product.

The suspension or solution from the liquid product reservoir 266 is flowed to the spray nozzles 240 using pressurized nitrogen gas. The nitrogen gas may pass though the sterile filter 232. The nozzles 240 are arranged to atomize the product within the cryogenic vessel 210. The atomization of the product results in a dispersion of fine particles within the cryogenic vessel 210. Both the size of the particles and the distribution of particle sizes are dependent on the spraying technology. For example, nozzle geometry, product flow rate and nozzle placement within the chamber may influence those process outputs. Particle size and size distribution are important to the application of the product. For example, for powder handling, it is preferable to have particle sizes above 100 microns, while for pulmonary applications, particle size should be around 6 microns.

In embodiments, the frozen product may fall through an atmosphere of nitrogen gas cooled by the walls of the cryogenic vessel 210. The dimensions of the vessel are such that a sufficient amount of time is allowed for the product to be in contact with the nitrogen atmosphere to allow freezing of the product before it reaches the bottom of the chamber. The spray-frozen liquid product collects at the bottom of the cryogenic vessel 210 as a frozen powder. The spray freezing process produces small particles of product that are quickly frozen because the smaller particles have a large surface area to mass ratio and therefore a minimal resistance to heat input. That property also speeds the drying process.

The isolation valve 268 separates the cryogenic vessel 210 from a drying chamber 260, and may be activated during one or both of the freezing stage and the drying stage. The isolation valve may remain closed during spray freezing within the cryogenic vessel in order to maintain sufficiently cold conditions within the vessel without needing to also chill the drying chamber. In certain embodiments, after a sufficient quantity of liquid product is spray-frozen and has been collected in the lower part of the cryogenic vessel 210, the isolation valve 268 is opened to permit the frozen product to fall from the cryogenic vessel 210 into the drying chamber 260 via a product transfer conduit 269. The isolation valve 268 may be opened once at the end of the freezing stage of the process, or may be opened periodically during the freezing stage to prevent excessive buildup of frozen product in the base of the cryogenic vessel 210. For example, the isolation valve 268 may be opened after freezing each 0.5 liter of product/medium suspension or solution, the frozen product transferred, and the isolation valve then closed to continue freezing more product, until a full batch (for example, 5 liters) has accumulated in the drying chamber 260. That procedure avoids a warming of the frozen product caused by accumulating excess frozen product on the isolation valve 268. The isolation valve is in direct communication with the drying chamber and is not temperature controlled.

In another example, the isolation valve is opened every 15 minutes to discharge frozen product into the drying chamber. In other examples, the isolation valve is opened every hour or every 30 minutes.

A temperature-controlled shelf 250 in the drying chamber 260 holds the frozen product that enters the chamber. A heat transfer fluid circulating with the shelf 250 is used to maintain a process temperature of the frozen product. For example, the product within the drying chamber 260 may be maintained in its frozen state as additional product is frozen in the cryogenic vessel 210, and the product within the drying chamber 260 may be slightly heated during the drying stage to induce sublimation of the medium.

A vibration unit 251 is connected to the shelf 250 to vibrate the shelf and impart vibratory motion in the frozen product. The shelf 250 may be vibrated after the freezing stage is complete or after each transfer of frozen product. The vibrating shelf spreads and levels the collected frozen product on the shelf, creating or maintaining a product bed having uniform thickness, which increases drying efficiency.

After completion of the freezing stage, a drying stage is performed in which the now-frozen medium is removed from the product using a sublimation process. During the drying stage of the disclosed freeze drying process, the cryogenic vessel 210 is maintained in a cold state by, for example, continuing to circulate cryogenic fluid in the double walls of the vessel. A vacuum pump 212 connected to the cryogenic vessel 210 is activated to evacuate the system. The cryogenic vessel 210 is evacuated directly by the vacuum pump 212. The vacuum pump 212 may be a separate stand-alone vacuum pump as shown in FIG. 2A, or may alternatively be part of a vacuum pump group 270 that also includes a liquid ring pump.

During the drying stage, the product transfer conduit 269 may be closed using the valve 268, and valves in one or more bypass conduits 214 are opened to connect the cryogenic vessel 210 to the drying chamber 260 via a vapor inlet 215 of the cryogenic vessel. The bypass conduits 214 bypass the product transfer conduit 269 and valve 268 to allow evacuation of the drying chamber 260 via the cryogenic vessel 210 without causing a choking of the vacuum pump 212 that may otherwise occur due to a small size of the product transfer conduit 269. Additionally, if the product transfer conduit were left open during the drying stage, ice or condensate may accumulate and block the area where the product transfer conduit enters the cryogenic vessel. In embodiments, the geometry of that area is designed to direct the frozen product into the drying chamber during the freezing stage, and is not designed to avoid ice accumulation during the drying stage. In other embodiments, both the bypass conduits and the product transfer conduit may be opened and used as vapor inlets during the drying stage. In yet other embodiments, no bypass conduits are provided and the product transfer conduit is used both for product transfer from the cryogenic vessel to the drying chamber and as a vapor inlet for flowing vapor from the drying chamber to the cryogenic vessel.

During the drying stage of the process, the frozen medium in the drying chamber 260 is subjected to vacuum and slightly heated by the shelf 250, causing the medium to sublime, and creating a vapor. The vapor is drawn from the drying chamber and into one or more vapor inlets of the cryogenic vessel 210 via the bypass conduits 214 and/or the product transfer conduit 269. The vapor condenses as ice on the interior walls of the cryogenic vessel, or on other cooling elements in the vessel. The condensed vapor is removed from the cryogenic vessel periodically or before starting a subsequent freeze drying batch, in which the vessel will be used to freeze the product/medium suspension.

The vacuum pump 212 is connected to the cryogenic vessel 210 via a vacuum outlet 213 of the cryogenic vessel. The vacuum outlet 213 is separate from the vapor inlets 215 of the cryogenic vessel 210 so that condensable vapor flowing from the drying chamber flows through the cryogenic vessel 210 and condenses on walls or other cooling elements in the cryogenic vessel. "Separate," as used herein, means that the vacuum outlet and vapor inlet are different openings accessing the interior of the cryogenic vessel. The two openings are advantageously spaced apart, and not adjacent to one another. In one example, the vacuum outlet 213 of the cryogenic vessel 210 may be near the top of the vessel, while the vapor inlet 215 may be near the bottom of the vessel 210, providing nearly a full length of the cryogenic vessel for condensation of vapor from the drying chamber.

After the drying stage is complete, both the drying chamber 260 and the cryogenic vessel 210 are returned to atmospheric pressure. The shelf 250 may be tilted and/or vibrated in order to transfer the dried product from the shelf to a dried product harvesting container 262. A sight glass 264 may be used for in-line NIR moisture determination after a batch is complete. The cryogenic vessel may again be isolated from the drying chamber to begin freezing a new batch of product.

Figure 3:
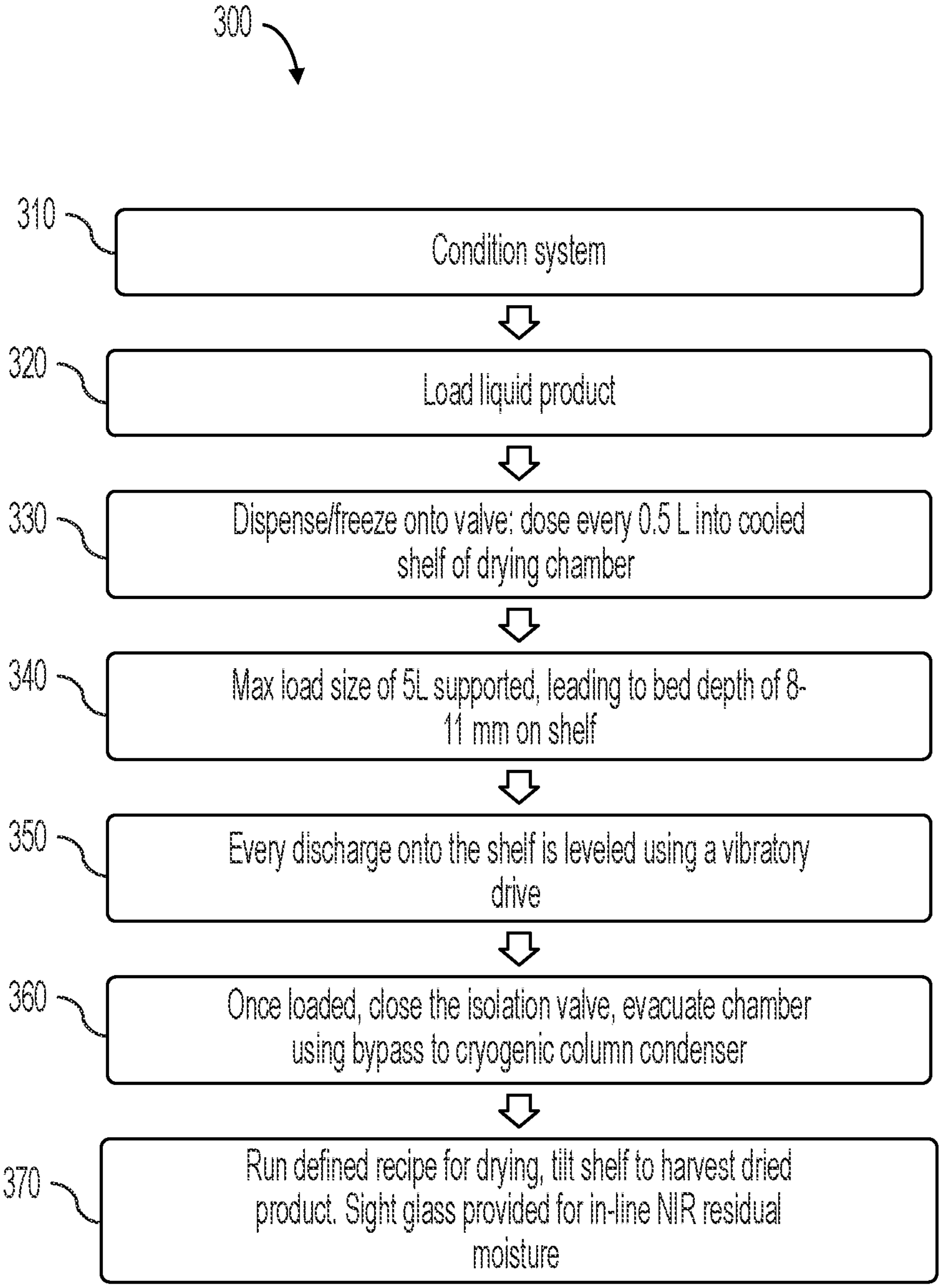
FIG. 3 is a flow chart showing a method in accordance with one aspect of the disclosure.

A method for freeze drying a bulk product containing a liquid, in accordance with embodiments of the invention, is illustrated by a flow chart 300 shown in FIG. 3. The system is initially conditioned, as shown at block 310. The cryogenic vessel 210 is cooled by circulating liquid nitrogen through a double wall or by using other cooling elements. The cryogenic vessel is purged with an atmosphere such as sterile nitrogen gas. The liquid product is then loaded, at block 320, from the liquid product reservoir 266, using a pressurized nitrogen gas, to a nozzle feed system adjacent to the nozzle(s) 240.

The freezing stage of the freeze drying process then commences, as shown in block 330. The liquid product is dispensed through the nozzles and frozen in the cryogenic vessel 210. The isolation valve 268 is periodically opened to permit a dose of frozen product to fall to the cooled shelf 250 of drying chamber 260. In the example referenced above, the valve is opened after freezing each 0.5 L of product/medium suspension.

After opening the isolation valve a single time or multiple times to transfer product into the drying chamber, the freezing stage of the freeze drying process ends at block 340. In an exemplary embodiment, the maximum batch size is 5 liters of product/medium suspension, leading to bed depth on the shelf 250 of 8-11 mm. Each time the isolation valve 268 is opened to discharge frozen product onto the shelf 250, the product on the shelf is leveled using the vibratory drive, as shown in block 350.

As illustrated in block 360, once the shelf 250 is loaded, the isolation valve 268 is closed, and valves in the bypass conduits are opened. The vacuum pump 212 is activated to evacuate the drying chamber 260 using the bypass conduits 214 connecting the drying chamber to the cryogenic vessel 210. A defined temperature and pressure sequence is then run for drying the batch of product, as shown in block 370. The sequence may be stored as part of a program in a programmable logic controller that controls the various components of the system. Upon completion of the drying operation, the drying chamber and the cryogenic vessel are returned to atmospheric pressure, the shelf 250 is tilted to harvest the dried product, and the sight glass 264 may be used to measure in-line NIR residual moisture.

The systems and methods described herein may be performed in part by an industrial controller and/or computer used in conjunction with the processing equipment described below. The equipment is controlled by a programmable logic controller (PLC) that has operating logic for valves, motors, etc. An interface with the PLC is provided via a PC. The PC loads a user-defined recipe or program to the PLC to run. The PLC will upload to the PC historical data from the run for storage. The PC may also be use for manually controlling the devices, operating specific steps such as freezing, defrost, steam in place, etc.

The PLC and the PC include central processing units (CPU) and memory, as well as input/output interfaces connected to the CPU via a bus. The PLC is connected to the processing equipment via the input/output interfaces to receive data from sensors monitoring various conditions of the equipment such as temperature, position, speed, flow, etc. The PLC is also connected to operate devices that are part of the equipment.

The memory may include random access memory (RAM) and read-only memory (ROM). The memory may also include removable media such as a disk drive, tape drive, etc., or a combination thereof. The RAM may function as a data memory that stores data used during execution of programs in the CPU, and is used as a work area. The ROM may function as a program memory for storing a program including the steps executed in the CPU. The program may reside on the ROM, and may be stored on the removable media or on any other non-volatile computer-usable medium in the PLC or the PC, as computer readable instructions stored thereon for execution by the CPU or other processor to perform the methods disclosed herein.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A freeze drying system for freeze drying a bulk product by removing a liquid, comprising:
- a cryogenic vessel having a cooling element;
- a product introduction inlet in communication with an interior of the cryogenic vessel and connected to a source of the bulk product;
- a drying chamber having a warming element;
- a selectively openable and closeable product transfer conduit connecting the cryogenic vessel with the drying chamber;
- at least one selectively openable and closeable bypass conduit connecting the cryogenic vessel with the drying chamber via at least one vapor inlet of the cryogenic vessel; and
- a selectively operable vacuum pump in communication with the interior of the cryogenic vessel via a vacuum outlet of the cryogenic vessel, the vacuum outlet of the cryogenic vessel being separate from the at least one vapor inlet of the cryogenic vessel.

2. The freeze drying system of claim 1, wherein the product introduction inlet further comprises at least one spray nozzle connected for spraying the bulk product into the cryogenic vessel.

3. The freeze drying system of claim 2, wherein the cryogenic vessel further comprises a cylindrical vessel having curved vertical walls, the at least one spray nozzle being connected at a top of the cylindrical vessel, and the cooling element comprising the curved vertical walls.

4. The freeze drying system of claim 1, further comprising a controller including memory storing a program that, when executed by the controller, causes the freeze drying system to perform:
- a freezing stage wherein the bulk product is introduced through the product introduction inlet, to produce a frozen powder in the cryogenic vessel at a first pressure, and wherein the frozen powder is transferred to the drying chamber via the product transfer conduit; and
- a drying stage wherein the vacuum pump evacuates the cryogenic vessel and the drying chamber to a vacuum pressure lower than the first pressure, and wherein a sublimated frozen liquid is drawn from the drying chamber into the cryogenic vessel via the at least one bypass conduit for condensation on the cooling element.

5. The freeze drying system of claim 1, wherein the cryogenic vessel is above the vacuum drying chamber, and the product transfer conduit connects a bottom of the cryogenic vessel with the drying chamber.

6. The freeze drying system of claim 1, wherein the drying chamber further comprises a shelf positioned for receiving product from the product transfer conduit.

7. The freeze drying system of claim 6, wherein the heating element comprises a heat transfer fluid circulating system in the shelf.

8. The freeze drying system of claim 6, further comprising a vibration unit connected for vibrating the shelf.

9. The freeze drying system of claim 6, further comprising a tilting unit connected for tilting the shelf.

10. A method for freeze drying a bulk product containing a liquid, comprising:

providing a cryogenic vessel having a cooling element;

providing a drying chamber having a warming element;

the cryogenic vessel and the drying chamber fluidly communicating via a transfer conduit intercepted by a transfer valve;

isolating the cryogenic vessel from the drying chamber by closing the transfer valve;

introducing the bulk product containing the liquid into the cryogenic vessel containing a gas having a first pressure and a temperature below a freezing point of the liquid, whereby the liquid is frozen to form a bulk product containing a frozen liquid in the cryogenic vessel;

removing the isolation of the cryogenic vessel from the drying chamber by opening the transfer valve;

transferring the bulk product containing frozen liquid from the cryogenic vessel to the drying chamber via the transfer conduit;

subjecting the cryogenic vessel and the drying chamber, while the cryogenic vessel and the drying chamber are in fluid communication, to a vacuum pressure lower than the first pressure, whereby the frozen liquid in the drying chamber sublimates to form a vapor;

drawing the vapor from the drying chamber to the cryogenic vessel; and condensing the vapor in the cryogenic vessel wherein opening the transfer valve to remove the isolation of the cryogenic vessel from the drying chamber further comprises opening an isolation valve in a selectively closeable product transfer conduit and wherein after transferring the bulk product, closing the isolation valve and opening a selectively closeable bypass conduit bypassing the selectively closeable product transfer conduit.

11. The method of claim 10, wherein introducing the bulk product containing the liquid into a cryogenic vessel comprises spraying the bulk product.

12. The method of claim 10, wherein transferring the bulk product containing frozen liquid from the cryogenic vessel to a drying chamber further comprises periodically:

opening the isolation valve in the selectively closeable product transfer conduit;

transferring a portion of a batch of bulk product containing frozen liquid onto a temperature-controlled shelf in the drying chamber;

closing the isolation valve; and repeating the introducing the bulk product containing the liquid into a cryogenic vessel.

13. The method of claim 10, wherein transferring the bulk product containing frozen liquid from the cryogenic vessel to a drying chamber further comprises transferring onto a shelf in the drying chamber;

the method further comprising:

vibrating the shelf to form a substantially even depth of the bulk product containing frozen liquid on the shelf.

14. The method of claim 10 further comprising:

circulating a cryogenic fluid in a cooling element of the cryogenic chamber during the introducing the bulk product containing the liquid into a cryogenic vessel containing a gas having a first pressure and during the subjecting the cryogenic vessel and the drying chamber to a vacuum pressure lower than the first pressure.

* * * * *